United States Patent [19]

Remy

[11] Patent Number: 6,091,950
[45] Date of Patent: Jul. 18, 2000

[54] SYSTEM AND METHOD FOR THE CONTROL OF A CELLULAR RADIOCOMMUNICATIONS NETWORK BY MEANS OF A SET OF PROTOCOL ANALYZERS AND MOBILE STATIONS

[75] Inventor: Jean-Gabriel Remy, Le Perreaux, France

[73] Assignee: Cofira Etudes et Gestion, Montrouge, France

[21] Appl. No.: 08/927,938

[22] Filed: Sep. 11, 1997

[30] Foreign Application Priority Data

Sep. 17, 1996 [FR] France .................................. 96 11531

[51] Int. Cl.$^7$ ....................................................... H04Q 7/34
[52] U.S. Cl. ........................ 455/423; 455/67.1; 455/424; 370/244; 379/1
[58] Field of Search .................................. 455/423, 424, 455/9, 67.1, 560, 67.3; 370/242, 245, 244, 252, 253, 338, 522, 524; 379/1, 22, 34

[56] References Cited

U.S. PATENT DOCUMENTS 5,590,116  12/1996  Zhang ...................................... 370/253

FOREIGN PATENT DOCUMENTS 0 710 043 A1  5/1996  European Pat. Off. .

OTHER PUBLICATIONS

ITG–Fachbericht, "GSM Signalisierung in der Praxis", No. 124, Sep. 1993, pp. 423–432.

Primary Examiner—Lee Nguyen
Attorney, Agent, or Firm—Kinney & Lange P.A.

[57] ABSTRACT

A system and method control a cellular radiocommunications network, in particular according to the GSM standard. The system of control includes fixed means for the recording and time-stamping of signalling information travelling through at least one interface among the various types of interfaces capable of being observed (such as, in particular, the Abis, A, "CCITT signalling system No. 7" and MAP interfaces); fixed means for the centralization of the recorded and time-stamped signalling data; means for the association of localization information with said signalling information so as to precisely localize segments of said cellular network located downline from each interface on which signalling information is recorded.

21 Claims, 4 Drawing Sheets

SYSTEM AND METHOD FOR THE CONTROL OF A CELLULAR RADIOCOMMUNICATIONS NETWORK BY MEANS OF A SET OF PROTOCOL ANALYZERS AND MOBILE STATIONS

BACKGROUND OF THE INVENTION

1. Field of the Invention

The field of the invention is that of cellular radiocommunications networks for communications with mobile stations, especially but not exclusively according to the GSM ("Global System for Mobile Communications") standard.

More specifically, the invention relates to a system and a method for the control of a cellular radiocommunications network.

The purpose of such control is to optimize the operation of the cellular radiocommunications network and, detect failures therein as fast as possible. It is also sought, through such control, to assess the quality of the service rendered.

To control a network, it is necessary to have an overall picture of it. Indeed, only an overall picture can make it possible to highlight the shortcomings and failures of the network, and diagnose their causes. The greater the speed and precision of the diagnosis, the faster will it be possible to make corrections, so as to reduce the sources of dissatisfaction among users as much as possible.

2. Description of the Prior Art

There are mainly two known techniques of control, each making it possible to obtain distinct views of the operation of a network.

Before these two known techniques of network control are presented with their respective disadvantages, a few structural characteristics of a cellular network shall be recalled briefly with reference to FIG. 1.

A cellular network generally includes at least one mobile switching center (or MSC in the GSM standard) enabling the interconnection of the cellular network with a fixed telephone network (for example, the public switched telephone network (PSTN)). At least one base station controller (or BSC in the GSM standard) is connected to each mobile switching center (MSC). At least one base transceiver station (or BTS in the GSM standard) is connected to each base station controller (BSC). Each base transceiver station (BTS) is associated with a distinct geographical cell in which mobile stations (MS) can move about. In addition, various specialized data bases such as the HLR (Home Location Register), VLR (Visitor Location Register), AuC (Authentication Center) and EIR (Equipment Identity Register) are connected to each mobile switching center (MSC).

Conventionally, the following five types of interfaces can be distinguished:

Air (or Um) interfaces, each located between a mobile station (MS) and the base transceiver station (BTS) of the geographical cell in which this mobile station is located, Abis interfaces, each located between a base transceiver station (BTS) and the corresponding base station controller (BSC), A interfaces, each located between a base station controller (BSC) and the corresponding mobile switching center (MSC), "CCITT signalling system No. 7" interfaces (ISUP, TUP, SSUTR2), each located between a mobile switching center (MSC) and the corresponding fixed telephone network (or public switched telephone network (PSTN)) or between two mobile switching centers (MSC), or between a mobile switching center (MSC) and a transit center;

MAP (Mobile Application Part) interfaces, each located between a mobile switching center (MSC) and a specialized data base (HLR, VLR, AuC, EIR).

The first known network control technique consists in using "look-out staff", i.e. staff travelling through a zone to be tested with measuring devices known as mobile tracking units (these mobile tracking units are generally specialized mobile telephones connected to computers to store the readings). The measurements (field, TEB and other measurements) are associated with the geographical position in which they are made through localizing beacons of the GPS (Global Positioning System) type. It is thus possible to construct coverage maps indicating problem areas as regards the Air interfaces.

The second known technique of network control consists in using staff to go and set up connections, depending on the geographical area to be examined, between one or more protocol analyzers and one or more interfaces (Abis, A, "CCITT signalling system No. 7" or again MAP) of the network. Each protocol analyzer then enables the interception of the signalling frames that circulate on the interface being monitored. After examination, very useful information can be deduced therefrom on the operation of the network, and in particular the behavior of the network in terms of traffic, failure of calls or of intercellular transfer (or handover).

In each of these two known techniques, therefore, a monitoring operation is implemented at certain interfaces of this network, namely in one technique the Air interfaces and, in the other technique, the Abis, A, "CCITT signalling system No 7" or MAP interfaces. Both of these techniques have disadvantages.

Thus, the first known technique gives only a limited number of information elements since it is implemented only at the Air interfaces, on the downlink radio channel, from fixed to mobile stations. In particular, it cannot be used to obtain information on the uplinks (from the mobile tracking units to the cellular network). In fact, this technique known as the "look-out staff" technique provides a partial perception of the quality of the network from the customer's point of view, and therefore gives only a partial vision of the operation of the network.

Moreover, with the first known technique, the feedback of information from the mobile tracking units is lengthy and complex. Indeed, at present, the data stored in each mobile tracking unit is copied on to diskettes so that it can be centralized and processed comprehensively. All this entails substantial periods of time for, in addition to the measurement time, there is the time taken to transfer data via the diskettes as well as the time taken to examine the results.

In addition, the mobile tracking units used in the first known technique are very expensive. Indeed, their price is generally twenty times higher than that of a conventional mobile station.

The second known technique, for its part, requires a large and qualified staff in the field. Indeed, at least one qualified person must be present at each recording site to connect the protocol analyzer correctly and control it adequately so that relevant information can be obtained in the limited time of the test.

With the second known technique, the feedback (from the protocol analyzers in the present case) is lengthy and complex, just as it is for the first known technique. Indeed, at present, the data stored in each protocol analyzer is copied on to diskettes so that it can be centralized and processed comprehensively. All this entails substantial periods of time for, in addition to the measurement time, there is the time taken to transfer data via the diskettes as well as the time taken to examine the results.

Finally, with the second known technique, it is not possible to associate the information obtained with any geographical information more precise than that pertaining to the cell itself. In other words, it is impossible to achieve a precise localization of the segment of the cellular network tested by an protocol analyzer. The term "segment of the cellular network tested" is understood here to mean the network section located between the monitored interface (i.e. the one to which the protocol analyzer is connected) and the mobile station or stations concerned (i.e. the station or stations about which protocol information travels through the monitored interface). This absence of any precise localization of the analyzed segments prevents the obtaining of an picture of the real conditions of operation on the ground, and therefore means that it is not possible to take any measurements that might be needed to correct a defect of quality in these analyzed segments.

The invention is aimed, especially, at mitigating these different drawbacks of the prior art.

SUMMARY OF THE INVENTION

More specifically, one of the aims of the present invention is to provide a system and a method to control a cellular radiocommunications network, said system and method being simpler and less expensive than the known approaches (in particular through the reduction of staff numbers and through the fact that no mobile tracking unit is required), while making it possible to gather a maximum amount of information on the operating condition of the network.

A complementary aim of the invention is to provide a system and method of this kind making it possible to reduce the periods of time between the phase of measurement and the phase for the supply, on the basis of the data obtained during the measurements, of information on an operating condition of the network.

The invention is also aimed at providing a system and method of this kind making it possible to perceive the operation of the network from the viewpoint of the operator (who manages the network) as well as that of the customer (who uses the network).

Another aim of the invention is to provide a system and method of this kind providing for a precise localization of the network segments analyzed and for obtaining a picture of the real condition of operation on the ground.

These various aims as well as others that shall appear hereinafter are achieved, according to the invention, by means of a system for the control of a cellular radiocommunications network for radiocommunications with mobile stations (MS), said cellular network comprising at least one mobile switching center (MSC) enabling the interconnection of the cellular network with a public switched telephone network (PSTN), at least one base station controller (BSC) being connected to each mobile switching center (MSC), at least one base transceiver station (BTS) being connected to each base station controller (BSC), each base transceiver station (BTS) being associated with a geographical cell, said cellular network having various types of interfaces capable of being observed, wherein said control system comprises:

fixed means for the recording and time-stamping of signalling information travelling through at least one interface among said types of interfaces capable of being observed; and fixed means for the centralization of the recorded and time-stamped signalling data;

means for the association of localization information with said signalling information so as to precisely localize segments of said cellular network located downline from each interface on which signalling information is recorded.

Preferably, said various types of interfaces capable of being observed comprise:

the Abis interfaces, each located between a base transceiver station (BTS) and the corresponding base station controller (BSC);

the A interfaces, each located between a base station controller (BSC) and the corresponding mobile switching center (MSC);

the "CCITT signalling system No. 7" interfaces (ISUP, TUP, SSUTR2), each located between:

two mobile switching centers (MSC), or one mobile switching center (MSC) and the corresponding public switched telephone network (PSTN) or one mobile switching center (MSC) and one transit center;

the MAP interfaces, each located between a mobile switching center (MSC) and a specialized data base (HLR, VLR, AuC, EIR) of said cellular network.

The general principle of the invention thus consists of the use of fixed recording and time-stamping means (i.e. protocol analyzers each dedicated to a given interface that has to be supervised) and of the automatic centralizing of all the signalling information taken at these interfaces (which, in particular, may belong to one or more of the following types: Abis, A, "CCITT signalling system No. 7" and MAP).

In other words, in order to achieve permanent monitoring of the network, the general principle of the invention lies in setting up a fixed connection of the protocol analyzers to the network (at some or all of the following types of interfaces: Abis, A, "CCITT signalling system No. 7" and MAP), making them record the signalling messages that travel through these interfaces, and periodically centralizing the data elements stored by the analyzers. These centralized data elements, once they are properly stored and formatted, could then be used to detect the problems of operation of the network. The analyses of the time-stamped signalling data relate in particular to the study of the responses in terms of load and the behavior of the network.

It must be noted that the association of localization information with signalling information makes it possible to control the operation on the ground (namely the operation as it is experienced by the customer) and not just the operation at the level of the system (as perceived by the operator).

It must be noted that this association is particularly advantageous in the case of Abis interfaces since an association of this kind makes it possible to do away with the need for any recording at the Air interfaces (and therefore the use of mobile tracking stations which are very costly). Indeed, once they are associated with precise geographical positions, the signalling information elements available at the Abis interfaces are more complete than those at the Air interfaces.

It is possible here to distinguish two types of events that give rise to protocol messages (i.e. to signalling information):

the communications and movements of the real subscribers; and the scenarios programmed in protocol message generators.

It should be noted that the protocol message generators (for example of the Tekelec GSM/T or MGTS types) produce massive flows of messages corresponding to a fictitious traffic that is representative of the behavior of thousands of subscribers. The observations associated with these messages are essential for at least two reasons:

when made on a test platform, these observations can be used to determine the limits at which a particular network element (for example a MSC or a BSC) shows behavior prejudicial to the quality of service for an operational network into which this element is integrated;

when made in the cellular network itself, they can be used to determine the weaknesses of an association of network elements well before these weaknesses are revealed by the real traffic (with unfortunate consequences for the service rendered to the customers).

Thus, the system of the invention does not require any movement of technicians on sites, whether it is in order to connect the protocol analyzers or to centralize recorded signalling information. In particular, this system avoids the cumbersome transfer of diskettes that exists in the above-mentioned prior art approaches.

Another advantage of the invention is that it can be used for the monitoring of the network on one or more levels according to whether the monitoring is done on only one or on several types of interfaces (for example on only the Abis type interface or else of all four types Abis, A, "CCITT signalling system No. 7" and MAP). Each interface level provides information of a distinct nature.

Thus, the signalling information taken at the Abis interfaces provides, in particular, information on the state of the radio uplinks and downlinks, on the handovers and on the course of the communications.

The signalling information taken at the A interfaces relates in particular to the processing of calls as a whole (traffic, unsuccessful calls, etc.) and to mobility (handovers).

The signalling information taken at the "CCITT signalling system No. 7" interfaces relates chiefly to information on the interface with the public switched telephone network (PSTN) and the flow of communications.

Finally, the signalling information taken at the MAP interfaces relates in particular to information on the movements of the mobile units, transfers of calls made, etc.

Preferably, said fixed recording and time-stamping means comprise:

at least one group of at least one protocol analyzer, each protocol analyzer of one and the same group being connected to the cellular network at the level of at least one distinct interface of one and the same type, so as to record and time-stamp signalling information travelling through said distinct interface, and said fixed means of centralization comprise:

at least one signalling data base, each signalling data base being associated with a distinct group of at least one protocol analyzer, and thus also with a given type of interfaces capable of being observed;

means for the transmission of the signalling information, recorded and time-stamped by each protocol analyzer, towards the signalling data base associated with the group to which said protocol analyzer belongs.

Advantageously, said means for the transmission of the signalling information recorded and time-stamped by each protocol analyzer comprises an independent data transmission network.

The independent data transmission network is for example a LAN (local area network) or WAN (wide area network) type of internal network specific to the operator.

Advantageously, said fixed recording and time-stamping means also comprise means for the remote control of each protocol analyzer.

Thus, the remote control of the analyzers removes the need for movement on the part of the technicians.

Preferably, said means for associating localization information with said signalling information comprise:

a localization data base;

at least one mobile control unit comprising, in particular:
a localization and time-stamping device delivering time-stamped localization information, and
one of said mobile stations, known as a mobile control station, said mobile control station functioning in data transmission mode and cooperating with said localization device so that said time-stamped localization information is transmitted, in particular through a communications link established by said mobile control station on said cellular network, to said localization data base, signalling information relating to said communications link being recorded and time-stamped by at least one of said protocol analyzers, and being transmitted towards and stored in the signalling data base associated with the group to which said protocol analyzer belongs;

means to synchronize each signalling data base with said localization data base, so that at least certain information elements of said time-stamped signalling information stored in each signalling data base are associated with time-stamped localization information stored in said localization data base.

Thus, a third type of protocol message generating events is created, namely calls that are deliberately initiated by operators travelling through specified routes. It may be recalled that the other two types of protocol message generating events, already referred to here above, are calls and the movements of real subscribers, as well as the scenarios programmed in protocol message generators.

It is important to note that the mobile control station of the invention is a completely conventional unit. Its cost is therefore much lower (about twenty times lower) than that of a specialized mobile tracking unit such as the one required by in the above-mentioned first known technique (known as the "look-out staff" technique).

Advantageously, said localization and time-stamping device is a simple or differential GPS type system of positioning by satellite.

Thus, there is a very precise localization (to within about 100 m) in longitude and latitude (in the case of the simple GPS), and as possibly also in height (in the case of the differential GPS). In addition, very precise time signals are also available in order to time-stamp the localization information.

Advantageously, said device also includes a fixed localization station, said localization information transmitted by said mobile control station being combined with a flow of data coming from said fixed localization station and then being stored in said localization data base, so as to increase the precision of the localization.

Thus, the precision of the localization is improved, for example to within 16 m.

Advantageously, each mobile control unit also comprises means for the formatting of said time-stamped localization information delivered by the localization and time-stamping device, in order to be able to introduce this information into frames transmitted by said mobile control station.

Thus, in the simplest case, the localization information generated by the localization device is placed directly in frames transmitted by the mobile control station. It is only if it is not possible to place the localization information directly in the frames in this way that the means to format the localization information are used.

Advantageously, said system also comprises means to process and present time-stamped signalling information and its associated time-stamped localization information.

This post-processing operation makes it possible to present the engineers in charge of engineering, parameter-setting, runing or maintenance with a real-life situation of the operation of the network on the ground. This enables them to take any steps that may be needed to correct a defect of quality in the analyzed radio segments. In general, the results displayed should be clear and easy to interpret. In particular, the presentation may be made in the form of maps, graphs, tables, lists, etc.

In a preferred embodiment of the invention, said cellular network is of the GSM type.

The invention also relates to a corresponding method for the control of a cellular radiocommunications network, wherein said method comprises a step for the recording, time-stamping and centralization of signalling information travelling through at least one interface of one of said types of interfaces capable of being observed, a step for the association of the localization information with said signalling information so as to precisely localize segments of said cellular network located downline from each interface on which signalling information is recorded, wherein said step for the recording, time-stamping and centralization of signalling information consists of:

the recording and time-stamping, by means of one or more fixed protocol analyzers, of signalling information travelling through one or more interfaces of one and the same type or of several of said types of interfaces capable of being observed;

the transmission, through an independent data transmission network, of the recorded and time-stamped signalling information towards one or more signalling data bases, each associated with one of said types of interfaces capable of being observed.

Preferably, said step for the association of localization information with signalling information consists of:

the transmission to a localization data base, in particular via a communications link established by a mobile station known as a mobile control station, on said cellular network, of the time-stamped localization information provided by a localization and time-stamping device; signalling information relating to said communications link established by the mobile control station being recorded and time-stamped by at least one of said protocol analyzers, and being transmitted towards and then stored in the signalling data base associated with the group to which said protocol analyzer belongs;

the synchronizing of each signalling data base with said localization data base, so that at least certain information elements of the time-stamped signalling information stored in each signalling data base are associated with the time-stamped localization information stored in the localization data base.

BRIEF DESCRIPTION OF THE DRAWINGS

Other features and advantages of the invention shall appear from the following description of two preferred embodiments of the invention, given by way of an indication as non-restrictive examples, and from the appended drawings, of which.

MORE DETAILED DESCRIPTION

The invention thus relates to a system and a method for the control of a cellular radiocommunications network. The general architecture of a cellular radiocommunications network of this kind has already been recalled here above with reference to FIG. 1.

Hereinafter in the description, only one GSM type cellular network shall be discussed. It is clear, however, that the invention is not limited to this particular type of network but can be applied more generally to all networks having an architecture that is substantially identical to the one presented in FIG. 1.

Figure 1:
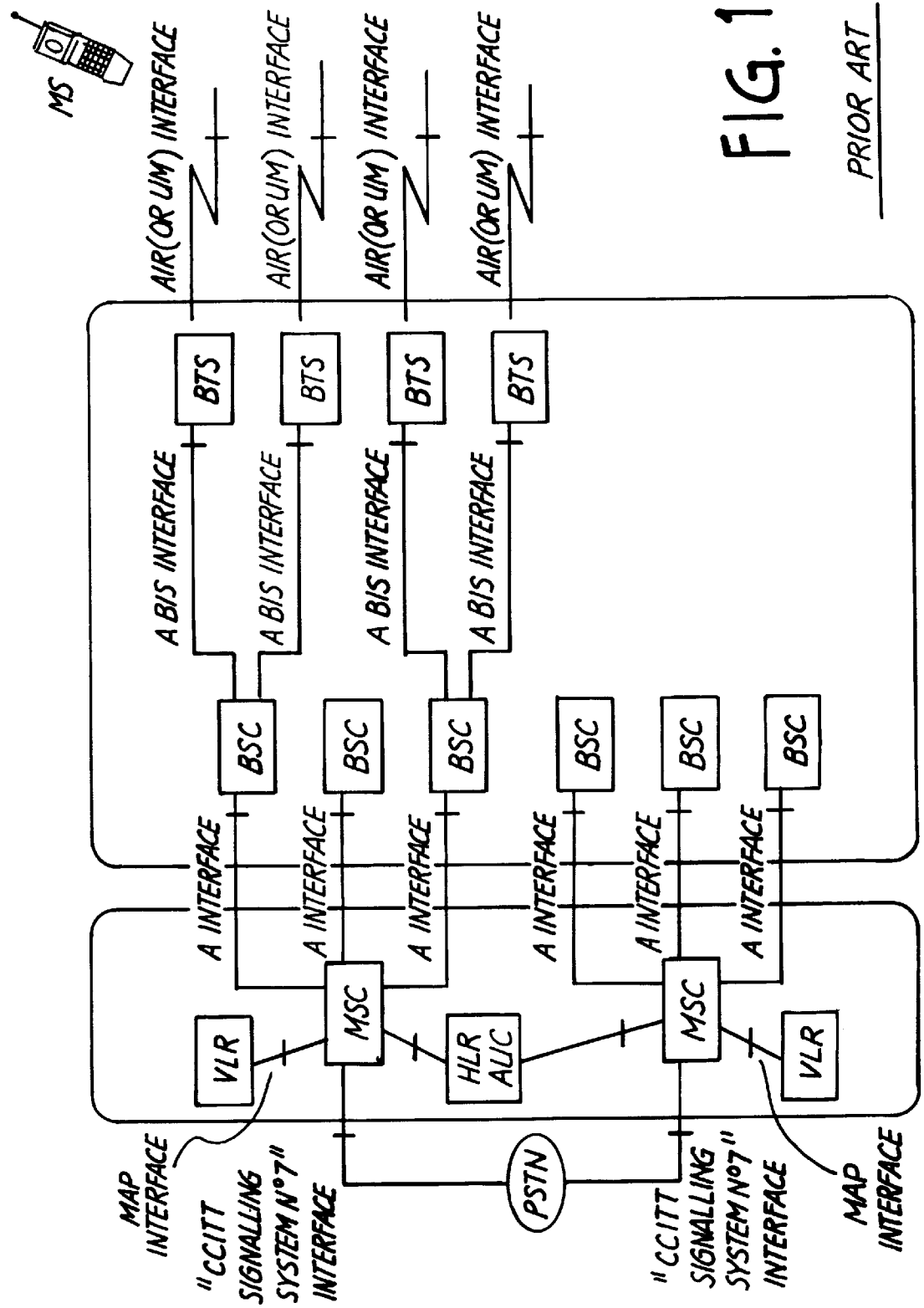
FIG. 1 gives a view, by way of a reminder, of a simplified drawing of the general architecture of a cellular radiocommunications network.

Here below, there are presented two distinct embodiments of the system according to the invention, enabling the control of a network of the type shown in FIG. 1.

Figure 2:
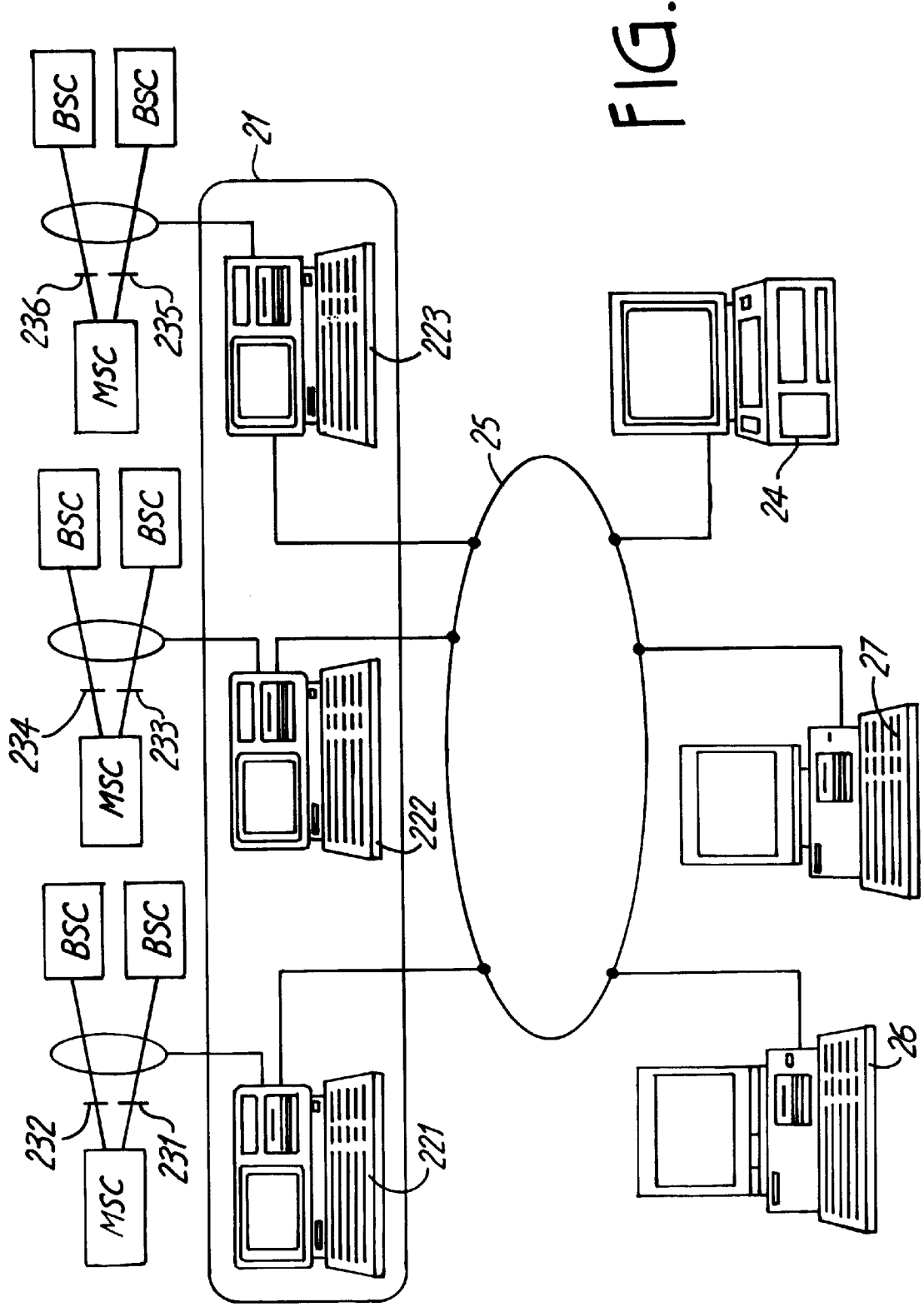
FIG. 2 shows a simplified drawing of a first embodiment of the system according to the invention enabling the control of a network of the type shown in FIG. 1.

In the first embodiment, presented with reference to FIG. 2, it is provided, according to the general principle of the invention, that the system will comprise:

fixed means for the recording and time-stamping of signalling information travelling through at least one interface of one of the following types of interfaces: Abis, A, "CCITT signalling system No. 7" and MAP; and fixed means for the centralization of recorded and time-stamped signalling information.

In this particular example, these fixed recording and time-stamping means include a group 21 of protocol analyzers $22_1$, $22_2$, $22_3$, and the fixed means of centralization include:

a signalling data base 24 associated with the group 21 of protocol analyzers $22_1$, $22_2$, $22_3$;

means 25 to transmit the signalling information recorded and time-stamped by each protocol analyzer $22_1$, $22_2$, $22_3$ towards the signalling data base 24.

The protocol analyzers $22_1$, $22_2$, $22_3$ are, for example, models with the reference K1103 by SIEMENS. These models K1103 are PC type microcomputers to which there have been added instruments for the acquisition of frames and for the analysis of various protocols. They make it possible to scrutinize the Abis, A, "CCITT signalling system No. 7" or MAP type interface to which they are connected, in order to extract the signalling messages therefrom. They also enable the time-stamping of the extracted messages by means of a clock servo-linked to a precise reference.

It should be noted that this model of protocol analyzer, when it is used at the interfaces A, enables the close examination of up to two BSCs simultaneously. Thus, in the example of FIG. 2, each of the three protocol analyzers $22_1$, $22_2$, $22_3$ is connected to the cellular network at two distinct A interfaces 231, 232, 233, 224, 225, 226. It will be noted that, in the case of the A interfaces, in order to cover an area as wide as Paris and its immediate suburbs, there could be up to ten protocol analyzers in action.

Machines of greater efficiency can be used to observe several tens of interfaces each. In this case, the above-mentioned PC type microcomputers are replaced by a more powerful workstation.

It is also possible to provide for total remote control of the protocol analyzers 221, 222, 223. For this purpose, the invention uses, for example, a communications software program that makes it possible to obtain remote control over another station, namely a protocol analyzer in the present case. Thus, in the present case, the protocol analyzers 221, 222, 223 can be programmed to send files of measurements at regular intervals, via transmission means 25, bound for the data base 24 of signalling information.

The means 25 for the transmission of signalling information may, for example, comprise an independent data transmission network such as an internal network of the operator of the controlled cellular network. This internal network 25, for example a network LAN or WAN of the token ring type, must enable the speedy and reliable transmission of the files.

The signalling data base 24 is, for example, located in a data bank service center that can be accessed, through the internal network 25, by any authorized station. This data bank service center is a powerful microcomputer or a workstation, with substantial storage space. It recovers the data extracted from a pre-processing operation on each protocol analyzer and stores it in the data base 24.

In the example presented, there are two additional local microcomputers 26, 27, also connected to the internal network 25. One microcomputer 26 gives access to the time-stamped signalling data stored in the signalling data base 24. The other microcomputer 27 enables the execution of interpretation, formatting or alarm programs, using this time-stamped signalling data.

It is clear however that, when there is a small volume of signalling data to be processed, it is quite possible to use only one local microcomputer to manage the signalling data base and execute the data exploitation programs.

In the example presented here above with reference to FIG. 2, the system of the invention controls the network at the A interfaces. It is clear that those skilled in the art will be able to adapt this example to the implementation of a control at the Abis, "CCITT signalling system No. 7" or MAP interfaces by providing, at each control level, for a distinct group of protocol analyzers as well as a distinct signalling data base. In this case, one and the same internal network 25 can be used to connect the various groups of protocol analyzers to their respective associated signalling data base. As an alternative, it is also possible to provide for a distinct internal network for each type of interface.

Moreover, it is quite possible to combine all or only some of these four control levels. Thus, in the example with the most complete configuration, the system of the invention provides for a control of the network by analysis of four types of interfaces, namely Abis, A, "CCITT signalling system No. 7" and MAP.

Figure 3:
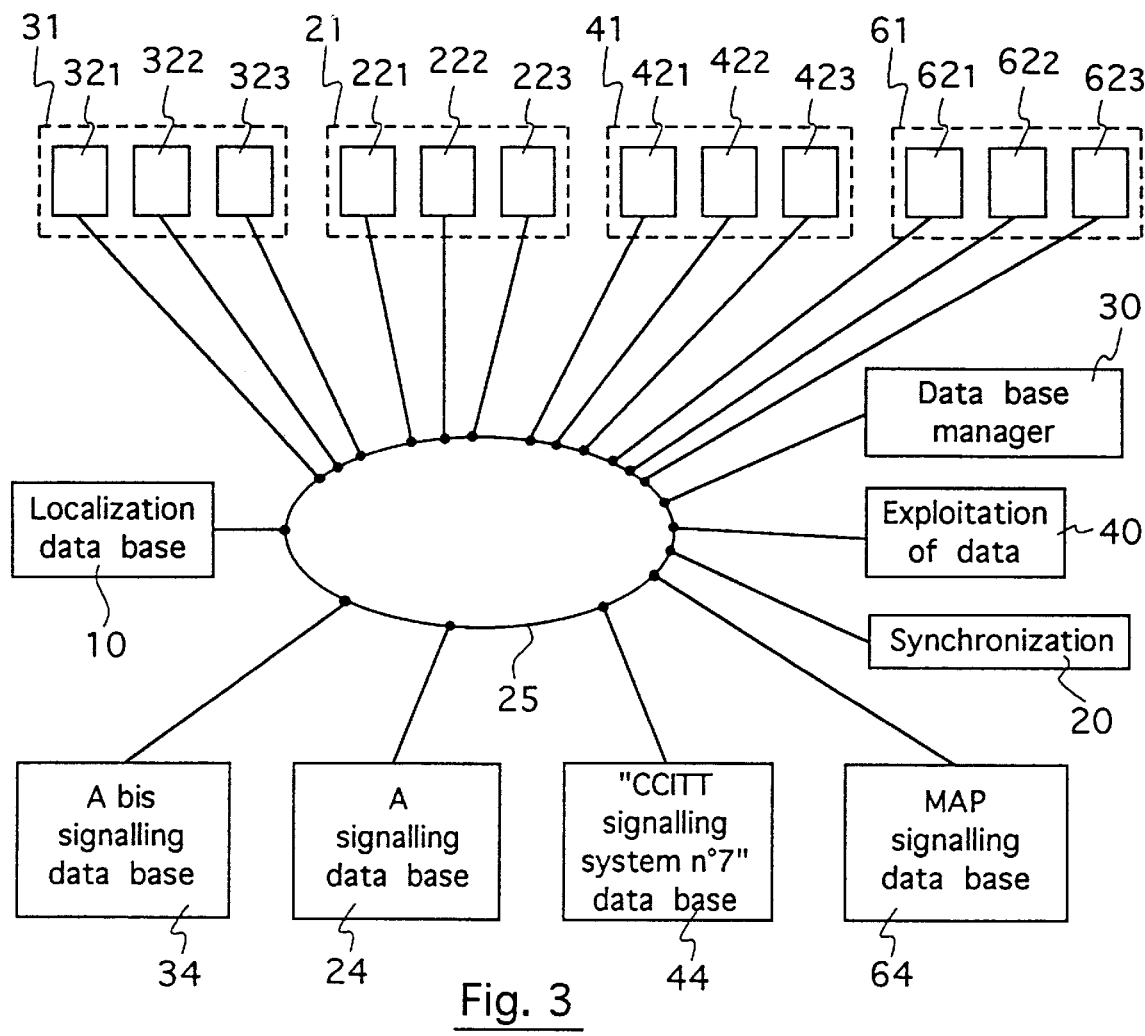
FIG. 3 shows a simplified drawing of a second embodiment of the system according to the invention, enabling the control of a network of the type shown in FIG. 1.
Figure 4:
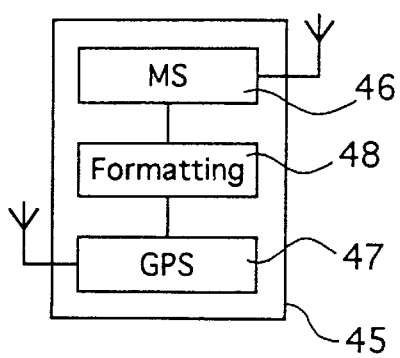
FIG. 4 shows a simplified drawing of a particular embodiment of a mobile control station according to the invention also included in the second embodiment of the system of the invention shown in FIG. 3.

In the second embodiment, which is now presented with reference to FIGS. 3 and 4, it is provided, in addition to the means mentioned here above for the first embodiment, that the system will furthermore include means for associating localization information with signalling information. The goal here to precisely localize segments of the cellular network located downline from each interface on which signalling information is recorded.

In FIG. 3, which shows a simplified diagram of this second embodiment of the system according to the invention, the fixed recording and time-stamping means and the centralization means comprise:

certain elements of FIG. 2 which enable control of the network by the monitoring of the A interfaces, namely the group 21 of protocol analyzers 221, 222, 223, the associated signalling data base 24 and the internal data transmission network 25; and other elements that enable control of the network by the monitoring of the Abis, "CCITT signalling system No. 7" and MAP interfaces, i.e. respectively three other groups 31, 41, 61 of protocol analyzers 321, 322, 323, 421, 422, 423, 621, 622, 623 each associated with a distinct signalling data base 34, 44, 64.

In other words, in the example presented here, the system enables control of the network by the monitoring of the four types of interfaces, A, Abis, "CCITT signalling system No. 7" and MAP.

In this second embodiment of the system according to the invention, the means for the association of localization information with signalling information comprise:

a localization data base 10;

at least one mobile control unit 45 (presented in detail here below with reference to FIG. 4), enabling the transmission, to the localization data base 10, of the time-stamped localization information time-stamped in relation to the signalling data recorded and time-stamped by the protocol analyzers;

means 20 for the synchronization of each signalling data base 24, 34, 44, 64 with the localization data base 10, so that at least certain of the time-stamped signalling information elements stored in each signalling data base are associated with time-stamped localization information stored in the localization data base.

The localization data base 10 is, for example, supported by a data bank service center accessible through the internal network 25.

In the example presented, two additional local microcomputers 30, 40 are also connected to the internal network 25. One of them, 30, is a data base manager that enables access to the signalling data stored in the signalling data bases 24, 34, 44, 64 and to the localization data stored in the localization data base 10. The other microcomputer 40 enables the execution of interpretation, formatting or alarm programs using the combination of signalling data and localization data.

This combination of signalling data and localization data makes it possible to transfer protocol sequences (i.e. signalling information) and to translate them into clear form (i.e. in terms of behavior of the network) on a geographical map. Thus, it is possible to obtain various maps such as:

a "best data bank service center" map enabling rapid display if the coverage corresponds to that expected;

a coverage map giving the coverage gaps;

a quality map giving an overall view of the quality in the zone;

a resurgence map making it possible to identify possible cases of resurgence;

a handover map making it possible to localize the various types of handovers;

etc.

The synchronization means 20 take the form, for example, of standard packages or cards.

The time-stamping of the localization information and signalling information forms the basis for the synchronization (or linking) of the various data bases (localization data base 10 and signalling data bases 24, 34, 44, 64). There are refinements related to the periods of time taken for processing by the various network elements. These refinements introduce a time lag between the protocol message on an interface (for example Abis) and its corresponding message on the following interfaces (for example A then "CCITT signalling system No. 7"). The knowledge of these time lags is in itself important for the modelling and control of the operation of the cellular network.

In the particular embodiment shown in FIG. 4, the mobile control unit 45 of the invention comprises a localization and time-stamping device 47 as well as a mobile control station 46.

The localization and time-stamping device 47 is for example a simple or differential GPS type satellite positioning system. It is also possible to envisage a fixed localization station (not shown). In this case, the localization information elements transmitted by the mobile control station 46 are combined with a data flow coming from the fixed localization station before being stored in the localization data base 10. Thus, the precision of the localization is increased.

The mobile control station 46 is a completely conventional mobile station. It functions in data transmission mode.

The operation of this second embodiment of the system of the invention shall now be presented.

Each operator provided with a mobile control unit 45 travels through a predetermined route. In real time, the GPS device 47 (included in the mobile control unit 45) makes it possible to generate time-stamped localization information, through the reception of GPS data (including precise time signals) transmitted by a constellation of satellites.

This time-stamped localization information is passed into the flow of data that the mobile control station 46 (contained in the mobile unit 45) transmits in "data" mode (for example at 9600 bits/s), via a communications link through the cellular network up to the localization data base 10.

In this localization data base 10, the GPS time-stamping is extracted in order to have precise and time-stamped localization information. It should be noted that, for an even more precise localization, a comparison is carried out with a fixed GPS reference (differential GPS).

In addition, through one or more groups 21, 31, 41, 61 of protocol analyzers 321, 322, 323, 421, 422, 423, 621, 622, 623, signalling information corresponding to the above-mentioned data flow, namely the flow transmitted by the mobile control station 46 through the cellular network towards the localization data base 10, is picked up at adequately chosen interfaces. Generally, the interfaces are selected as a function of the predetermined path through which the operator travels. Each protocol analyzer has a clock servo-linked to a precise reference (GPS reference, France Inter reference (162 kHz), German DCF reference (77,5 kHz), British MSF reference (60 kHz), etc.). Thus, this signalling information can be time-stamped before being stored in one of the signalling data bases 24, 34, 44, 64.

Since the localization information, like the signalling information, is time-stamped, it is possible to synchronize these various data bases, namely the localization data base 10 and signalling data bases 24, 34, 44, 64. This makes it possible to position signalling information (and to translate it in the form of telephone events) on a geographical map.

If necessary, the mobile control unit 45 of the invention also includes means 48 to format the time-stamped localization information delivered by the localization device 47 so that this localization information can be introduced into frames transmitted by the mobile control station 46. It is clear that these formatting means 48 are necessary only when the time-stamped localization information cannot be directly introduced into frames transmitted by the mobile control station 46.

Both entities 46, 47 of the mobile control station or all three entities 46, 47, 48 of this station can be brought together in one and the same package or be placed in two different packages (or three different packages as the case may be).

It is clear that the principle of the invention on which the second embodiment is based, namely the combining of the time-stamped localization information, received in feedback via a GSM commnunications link, with signalling information which too is time-stamped, can be applied to control at several levels of interfaces, for example four levels (Abis, A, "CCITT signalling system No. 7" and MAP) in the case presented above, as well as to control at only one, two or three levels of interfaces.

Figure 5:
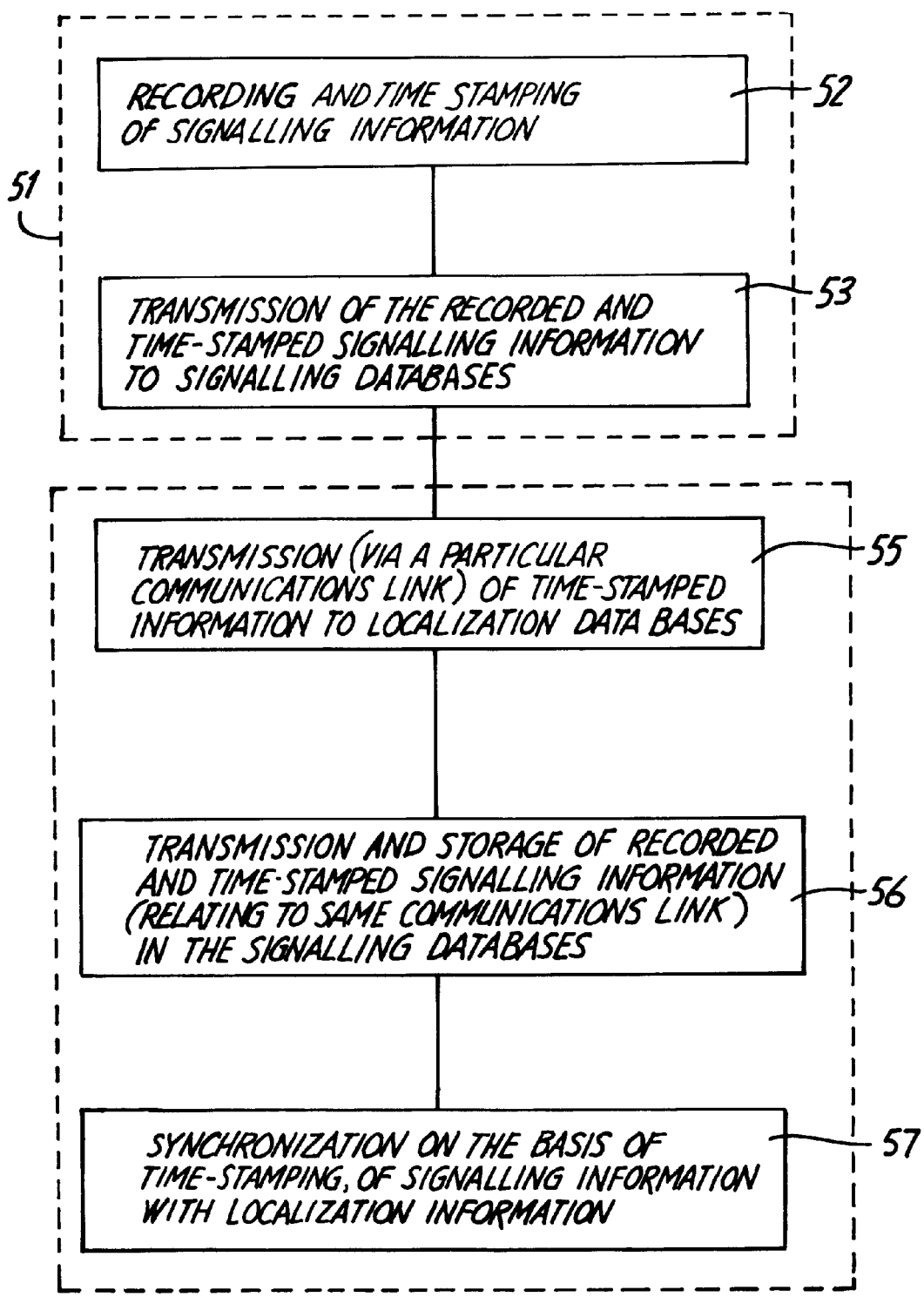
FIG. 5 is a simplified flow chart of a particular embodiment of the method according to the invention, enabling the control of a network of the type shown in FIG. 1.

The invention also relates to a method for the control of a cellular radiocommunications network. When it is implemented in the system presented above, and as shown in the simplified flow chart of FIG. 5, this method comprises for example the following two steps:

- a step 51 for the recording, time-stamping and centralization of signalling information travelling through at least one of the following types of interface: Abis, A, "CCITT signalling system No. 7" and MAP; and
- a step 54 for the association of localization information with signalling information.

The step 51 for the recording, time-stamping and centralization of signalling information consists of:

- the recording and time-stamping (52), by means of one or more fixed protocol analyzers 221, 222, 223, 321, 322, 323, 421, 422, 423, 621, 622, 623, of signalling information travelling through one or more interfaces of one and the same type or of several types: Abis, A, "CCITT signalling system No. 7" and MAP;
- the transmission (53), via an independent data transmission network 25, of the recorded and time-stamped signalling information towards one or more signalling data bases 24, 34, 44, 64, each associated with one of the types of interfaces, Abis, A, "CCITT signalling system No. 7" and MAP.

The step 54 for the association of localization information with signalling information consists for example of:

- the transmission (55), to a localization data base 10, in particular via a communications link established by a mobile control station 46, on the cellular network, of the time-stamped localization information provided by a localization and time-stamping device 47,
- the recording and time-stamping, with at least one protocol analyzer, of signalling information relating to this communications link established by the mobile control station, then the transmission (56) and storage of this information in the signalling data bases 24, 34, 44, 64 associated with the group 21, 31, 41, 61 to which this protocol analyzer belongs;
- the synchronization (57), on the basis of the time-stamping of the various information elements, of each signalling data base 24, 34, 44, 64 with the localization data base 10, so that at least certain information elements of the time-stamped signalling information stored in each signalling data base 24, 34, 44, 64 are associated with the time-stamped localization information stored in the localization data base 10.

What is claimed is:

1. A system for the control of a cellular radiocommunications network for radiocommunications with mobile stations (MS), said cellular network comprising at least one mobile switching center (MSC) enabling the interconnection of the cellular network with a public switched telephone network (PSTN), at least one base station controller (BSC) being connected to each mobile switching center (MSC), at least one base transceiver station (BTS) being connected to each base station controller (BSC), each base transceiver station (BTS) being associated with a geographical cell, said cellular network having various types of interfaces capable of being observed, wherein said control system comprises:

fixed means for the recording and time-stamping of signalling information travelling through at least one interface among said various types of interfaces capable of being observed, in order to obtain recorded and time-stamped signalling information;

fixed means for the centralization of the recorded and time-stamped signalling information;

means for obtaining and time-stamping localization information concerning place(s) where said at least one interface is effectively observed, in order to obtain time-stamped localization information; and means for the association of said time-stamped localization information with said recorded and time-stamped signalling information so as to precisely localize segments of said cellular network located downline from each interface on which signalling information is recorded.

2. A system according to claim 1, wherein said various types of interfaces capable of being observed comprise:

the Abis interfaces, each located between a base transceiver station (BTS) and the corresponding base station controller (BSC);

the A interfaces, each located between a base station controller (BSC) and the corresponding mobile switching center (MSC);

the "CCITT signalling system No. 7" interfaces (ISUP, TUP, SSUTR2), each located between:
two mobile switching centers (MSC), or
one mobile switching center (MSC) and the corresponding public switched telephone network (PSTN) or
one mobile switching center (MSC) and one transit center;

the MAP interfaces, each located between a mobile switching center (MSC) and a specialized data base (HTR, VLR, AuC, EIR) of said cellular network.

3. A system according to claim 1, wherein said fixed recording and time-stamping means also comprise means for the remote control of each protocol analyzer.

4. A system according to claim 1, wherein said cellular network is of the GSM type.

5. A system according to claim 1, wherein the means for obtaining and time-stamping localization information is a GPS type device.

6. (A system according to claim 1,) A system for the control of a cellular radiocommunications network for radiocommunications with mobile stations MS), said cellular network comprising at least one mobile switching center (MSC) enabling the interconnection of the cellular network with a public switched telephone network (PSTN), at least one base station controller (BSC) being connected to each mobile switching center (MSC), at least one base transceiver station (BTS) being connected to each base station controller (BSC), each base transceiver station (BTS) being associated with a geographical cell, said cellular network having various types of interfaces capable of being observed, wherein said control system comprises:

fixed means for the recording and time-stamping of signalling information travelling through at least one interface among the various types of interfaces capable of being observed;

fixed means for the centralization of the recorded and time-stamped signalling information; and means for the association of localization information with said signalling information so as to precisely localize segments of said cellular network located downline from each interface on which signalling information is recorded, wherein said fixed recording and time-stamping means comprise:

least one group of protocol analyzers, each protocol analyzer of the group being connected to the cellular network at the level of at least one distinct interface of the same type of interface, so as to record and time-stamp signalling information travelling through said distinct interface, and said fixed means of centralization comprise:

at least one signalling data base, each signalling data base being associated with a distinct group of protocol analyzers, and thus also with a given type of interfaces capable of being observed; and means for the transmission of the signalling information, recorded and time-stamped by each protocol analyzer, towards the signalling data base associated with the group to which the protocol analyzer belongs.

7. A system according to claim 6, wherein said means for the transmission of the signalling information recorded and time-stamped by each protocol analyzer comprises an independent data transmission network.

8. (A system according to claim 1,) A system for the control of a cellular radiocommunications network for radiocommunications with mobile stations (MS), said cellular network comprising at least one mobile switching center (MSC) enabling the interconnection of the cellular network with a public switched telephone network (PSTN), at least one base station controller (BSC) being connected to each mobile switching center (MSC), at least one base transceiver station (BTS) being connected to each base station controller (BSC), each base transceiver station (BTS) being associated with a geographical cell, said cellular network having various types of interfaces capable of being observed, wherein said control system comprises:

fixed means for the recording and time-stamping of signalling information travelling through at least one interface among the various types of interfaces capable of being observed;

fixed means for the centralization of the recorded and time-stamped signalling information; and means for the association of localization information with said signalling information so as to precisely localize segments of said cellular network located downline from each interface on which signalling information is recorded, wherein said means for associating localization information with said signalling information comprise:

a localization data base;

at least one mobile control unit comprising, in particular:

a localization and time-stamping device delivering time-stamped localization information, and one of said mobile stations, known as a mobile control station, said mobile control station functioning in data transmission mode and cooperating with said localization and time-stamping device so that said time-stamped localization information is transmitted, in particular through a communications link established by said mobile control station on said cellular network, to said localization data base, wherein signalling information relating to the communications link between the mobile control station and the cellular network being recorded and time-stamped by at least one of said protocol analyzers, and being transmitted towards and stored in the signalling data base associated with the group to which said protocol analyzer belongs;

means to synchronize each signalling data base with said localization data base, so that at least certain information elements of said time-stamped signalling information elements of said time-stamped signalling information stored in each signalling data base are associated with time-stamped localization information stored in said localization data base.

9. A system according to claim 8, wherein said localization and time-stamping device is a simple or differential GPS type system of positioning by satellite.

10. A system according to claim 9, wherein said localization and time-stamping device also includes a fixed localization station, said localization information transmitted by said mobile control station being combined with a flow of data coming from said fixed localization station and then being stored in said localization data base, so as to increase the precision of the localization.

11. A system according to claim 8, wherein each mobile control unit also comprises means for the formatting of said time-stamped localization information delivered by the localization and time-stamping device, in order to be able to introduce this information into frames transmitted by said mobile control station.

12. A system according to claim 8, also comprising means to process and present time-stamped signalling information and its associated time-stamped localization information.

13. A method for the control of a cellular radiocommunications network for radiocommunications with mobile stations (MS), said cellular network comprising at least one mobile switching center (MSC) enabling the interconection of the cellular network with a public switched telephone network (PSTN), at least one base station controller (BSC) being connected to each mobile witching center (MSC) at least one base transceiver station (BTS) connected to each base station controller (BSC), each transceiver station (BTS) being associated with a geographical cell, said cellar network having various types of interfaces capable of being observed, wherein said method comprises step for the recording and time-stamping of signalling information travelling through at least one interface of one of said various types of interfaces capable of being observed, in order to obtain recorded and time-stamped signalling information;

a step for the centralization of the recorded and time-stamped signalling information, by transmission towards one or more signalling data bases;

a step for obtaining and time-stamping localization information concerning place(s) where said at least one interface is effectively observed, in order to obtain time-stamped localization information; and a step for the association of said time-stamped localization information with said recorded and time-stamped signalling information so as to precisely localize segments of said cellular network located downline from each interface on which signalling information is reeled.

14. A method according to claim 13, wherein said various types of interfaces capable of being observed comprise:

the Abis interfaces, each located between a base transceiver station (BTS) and the corresponding base station controller (BSC);

the A interfaces, each located between a base station controller (BSC) and the corresponding mobile switching center (MSC);

the "CCITT signalling system No. 7" interfaces (ISUP, TUP, SSUTR2), each located between:
two mobile switching centers (MSC), or
one mobile switching center (MSC) and the corresponding public switched telephone network (PSTN) or
one mobile switching center (MSC) and one transit center;

the MAP interfaces, each located between a mobile switching center (MSC) and a specialized data base (HLR, VLR, AuC, EIR) of said cellular network.

15. A method according to claim 13, wherein said step for the recording and time-stamping of signalling information comprises:

the recording and time-stamping, by means of one or more fixed protocol analyzers, of signalling information travelling through one or more interfaces capable of being observed; and the transmission of the recorded and time-stamped signalling information towards one or more signalling data bases, each associated with one of said types of interfaces capable of being observed.

16. A method according to claim 15, wherein said transmission of the recorded and time-stamped signalling information towards one or more signalling data bases is made through an independent data transmission network.

17. (A method according to claim 12,) A method for the control of a cellular radiocommunications network for radiocommunications with mobile stations (MSC), said cellular network comprising at least one mobile switching center (MSC) enabling the interconnection of the cellular network with a public switched telephone network (PSTN), at least one base station controller (BSC) being connected to each mobile switching center (MSC) at least one base transceiver station (BTS) connected to each base station controller (BSC), each transceiver station (BTS) being associated with a geographical cell, said cellular network having various types of interfaces capable of being observed, wherein said method comprises a step for the recording and time-stamping of signalling information travelling through at least one interface of one of said various types of interfaces capable of being observed;

a step for the centralization of the recorded and time-stamped signalling information, by transmission towards one or more signalling data bases; and a step for the association of localization information with said signalling information so as to precisely localize segments of said cellular network located downline from each interface on which signalling information is recorded, wherein said step for the association of localization information with signalling information consists of:

the transmission to a localization data base, in particular via a communications link established by a mobile station (MS) known as a mobile control station, on said cellular network, of the time-stamped localization information provided by a localization and time-stamping device;

the recording and time stamping, with at least one protocol analyzer, of signalling information relating to said communications link established by the mobile control station;

the transmission and storage of the recorded and time stamped signalling information in the signalling data bases associated with the group to which said protocol analyzer belongs;

the synchronizing of each signalling data base with said localization data base, so that at least certain information elements of the time-stamped signalling information stored in each signalling data base are associated with the time-stamped localization information stored in the localization data base.

18. A system for the control of a cellular radiocommunications network for radiocommunications with mobile stations (MS), said cellular network comprising at least one mobile switching center (MSC) enabling the interconnection of the cellular network with a public switched telephone network (PSTN), at least one base station controller (BSC) being connected to each mobile switching center (MSC), at least one base transceiver station (BTS) being connected to each base station controller (BSC), each base transceiver station (BTS) being associated with a geographical cell, said cellular network having various types of interfaces capable of being observed, wherein said control system comprises:

fixed means for the recording and time-stamping of signalling information traveling through at least one interface among said various types of interfaces capable of being observed, wherein said fixed recording and time-stamping means comprise at least one group of protocol analyzers, each protocol analyzer of each group being connected to the cellular network at the level of at least one distinct interface of the same type of interface, so as to record and time-stamp signalling information travelling through said distinct interface;

fixed means for the centralization of the recorded and time-stamped signalling information, wherein said fixed means of centralization comprise:

at least one signalling data base, each signalling data base being associated with a distinct group of protocol analyzers, and thus also with a given type of interfaces capable of being observed;

means for the transmission of the signalling information, recorded and time-stamped by each protocol analyzer, towards the signalling data base associated with the group to which the protocol analyzer belongs; and means for the association of localization information with said signalling information so as to precisely localize segments of said cellular network located downline from each interface on which signalling information is recorded.

19. A system according to claim 18, wherein said means for associating localization information with said signalling information comprise:

a localization data base;

at least one mobile control unit comprising, in particular:

a localization and time-stamping device delivering time-stamped localization information, and one of said mobile stations, known as a mobile control station, said mobile control station functioning in data transmission mode and cooperating with said localization and time-stamping device so that said time-stamped localization information is transmitted, in particular through a communications link established by said mobile control station on said cellular network, to said localization data base, signalling information relating to the communications link between the mobile control station and the cellular network being recorded and time-stamped by at least one of said protocol analyzers, and being transmitted towards and stored in the signalling data base associated with the group to which said protocol analyzer belongs;

means to synchronize each signalling data base with said localization data base, so that at least certain information elements of said time-stamped signalling information elements of said time-stamped signalling information stored in each signalling data base are associated with time-stamped localization information stored in said localization data base.

20. A system according to claim 19, wherein said localization and time-stamping device is a simple or differential GPS type system of positioning by satellite.

21. A system according to claim 20, wherein said localization and time-stamping device also includes a fixed localization station, said localization information transmitted by said mobile control station being combined with a flow of data coming from said fixed localization station and then being stored in said localization data base, so as to increase the precision of the localization.

* * * * *